United States Patent
Barfoot et al.

(10) Patent No.: US 8,894,277 B2
(45) Date of Patent: Nov. 25, 2014

(54) CALIBRATED FIRE DETECTION CABLE

(75) Inventors: David Barfoot, Houston, TX (US); Mikko Jaaskelainen, Katy, TX (US)

(73) Assignee: SensorTran, Inc., Houston, TX (US)

( * ) Notice: Subject to any disclaimer, the term of this patent is extended or adjusted under 35 U.S.C. 154(b) by 317 days.

(21) Appl. No.: 13/503,152

(22) PCT Filed: Oct. 20, 2010

(86) PCT No.: PCT/US2010/002801
§ 371 (c)(1),
(2), (4) Date: Apr. 20, 2012

(87) PCT Pub. No.: WO2011/049624
PCT Pub. Date: Apr. 28, 2011

(65) Prior Publication Data
US 2012/0250722 A1    Oct. 4, 2012

Related U.S. Application Data

(60) Provisional application No. 61/279,394, filed on Oct. 20, 2009.

(51) Int. Cl.
| | |
|---|---|
| G01K 15/00 | (2006.01) |
| G01K 11/00 | (2006.01) |
| G08B 17/06 | (2006.01) |
| G01K 11/32 | (2006.01) |

(52) U.S. Cl.
CPC ............... G08B 17/06 (2013.01); G01K 11/32 (2013.01)
USPC ............................................. 374/1; 374/161

(58) Field of Classification Search
USPC ........ 374/1, 135, 36, 57; 340/577; 700/41, 45
See application file for complete search history.

(56) References Cited

U.S. PATENT DOCUMENTS

| | | | | |
|---|---|---|---|---|
| 3,770,946 | A * | 11/1973 | Fertik et al. | 700/89 |
| 4,623,788 | A * | 11/1986 | Kern et al. | 250/227.11 |
| 4,701,624 | A * | 10/1987 | Kern et al. | 250/554 |
| 4,855,718 | A   | 8/1989  | Cholin | |
| 4,928,255 | A * | 5/1990  | Brennecke et al. | 700/301 |
| 5,062,704 | A * | 11/1991 | Bateman | 356/73.1 |
| 5,144,125 | A   | 9/1992  | Carter | |
| 6,317,637 | B1* | 11/2001 | Limroth | 700/42 |
| 2007/0127034 | A1* | 6/2007 | Koshimizu et al. | 356/498 |

* cited by examiner

*Primary Examiner* — Lisa Caputo
*Assistant Examiner* — Nasir U Ahmed
(74) *Attorney, Agent, or Firm* — Michael A. Ervin; Krueger Iselin LLP

(57) ABSTRACT

A system and method for providing greatly improved linear heat detection using fiber optic distributed temperature systems (DTS). The invention makes use of correction algorithms based on proportional-integral-derivative notions that anticipate exterior temperature increases based on the rate of measured temperature changes.

12 Claims, 5 Drawing Sheets

CALIBRATED FIRE DETECTION CABLE

CROSS REFERENCE TO RELATED APPLICATIONS

This application claims the benefit of U.S. provisional Ser. No. 61/279,394 filed Oct. 20, 2009.

TECHNICAL FIELD

This disclosure relates to distributed measurement systems for detecting very rapid temperature changes such as in heat detection systems.

BACKGROUND OF THE DISCLOSURE

For several years, fiber optic sensors, and in particular, DTS systems, where an optical fiber is used as sensing medium based, have provided higher bandwidth, inherently safe operation (no generation of electric sparks), and immunity from EMI (Electromagnetic Interference) for parameter measurements. DTS systems are used in many industries, including, the oil and natural gas industry, electrical power cable industry, process control industry, and many other industrial applications where distributed asset monitoring is required. Generally, DTS systems use spontaneous Raman scattering as an underlying principle. A light source, typically a laser, launches a primary laser pulse that gives rise to two spectral components namely Stokes, which has a lower frequency and higher wavelength than launch laser pulse, and anti-Stokes, which has higher frequency and lower wavelength than the launch laser pulse. The anti-Stokes signal is usually about an order of magnitude weaker than the Stokes signal at room temperature and is typically a temperature sensitive signal while the Stokes signal is weakly temperature dependent. The ratio between the anti-Stokes and Stokes signals may be used to determine the temperature of the optical fiber.

One challenge with current systems and techniques is the ability to measure temperature profiles with a rapid response to temperature change. A DTS system uses a sensing cable consisting of an optical fiber encased in suitable materials to provide the ruggedness required for the deployment and operating environment. This can mean that the optical fiber is too well insulated from the temperature to be measured fast and accurately. But there are applications in which the response time is critical. One application is linear heat detection systems for use in for example fire detection in structures.

Man-made structures of all kinds often require linear heat detection systems. Early detection of abnormal build-up of heat is critical to prevent large-scale fire damage. Many systems have been used commercially to meet this need. These range from simple smoke detectors to thermocouple systems that provide single point detection to distributed systems that may provide continuous temperature readings along an extended distance.

Linear heat detection systems are required in several areas like tunnels and subways. Early detection of abnormal heat sources may be used to prevent fires before a fire occurs. In the event of fire, the systems provide an indication of a fire. There are many different systems available on the market ranging from simple on/off alarms like smoke detectors to thermocouples that provide single point temperatures to distributed sensing systems that may provide continuous temperature readings along the full length of the sensing cable.

Electric cabling systems that can extend over long distances in tunnels are an example application in which linear heat detection is important. Current approaches can be divided into single point sensors of various kinds and digital linear heat detection systems that provide indication of hot spots along the length of a cable.

Another application for linear heat detection is the need to track fluid flow in oil and gas wells by monitoring differences in fluid temperature. Monitoring the movement of a fluid front or slug of chemicals rapidly can indicate which perforated zones are being treated by chemicals and allow the operator to divert the flow in real time to the zones that did not get fluids/chemicals.

A related application is the monitoring of certain kinds of pipelines such as sulfur pipelines. One of the critical aspects of the system performance criteria for a sulfur pipeline is the ability to re-melt solidified sulfur in the pipeline. Under adverse conditions, there is a possibility that power to the pipe heating system could be cut-off. If a prolonged power outage occurs, the down time may be long enough to result in sulfur solidification inside the pipeline. Liquid sulfur shrinks in its volume by approximately 10% as it changes from liquid to solid. The reduction in volume will create voids at various locations and packed sulfur in other locations. When the sulfur pipeline is re-heated, excessive pressure generated by uneven melting of sulfur (expansion) in pockets could burst the pipe due to localized high pressure.

The use of fiber optic temperature monitoring and control systems offers incredible insight into the temperature profile of the pipeline, especially during re-melt conditions.

Single point temperature sensors may be based on e.g. thermistors where the resistance changes with temperature. These devices require two electrical leads per sensor and the number of electrical leads will therefore increase proportionally with the number of sensing points required. The drawbacks of electrical single point sensors are:
(1) The number of leads required grows proportionally with the number of sensing points.
(2) The location and spacing of single point sensors are critical and a fire may start at a location between sensors and this may increase the time before a fire is detected and preventive actions can be taken.

To overcome the second drawback, digital Linear Heat Detection Sensing (LHDS) systems have been brought to the market, especially for fire detection. A distributed Digital Linear Heat Detector sensing cable often comprises a twisted pair core cable. Each core has a carefully selected metal to add tensile strength, good conductivity while providing good corrosion resistance. This twisted pair core cable will then be deployed under tension. The conductor has special heat reactive polymer insulation. The cable has an overall protective sheath.

The primary mechanism of heat detection in such a system is that the inner core insulating polymer is specially formulated such that it plasticizes at a specific temperature. The cable is constructed such that the twisted steel cores are in tension, and at the polymer trigger temperature the conductors connect. This provides an alarm signal to any associated monitoring device. The system will be able to detect a single point fire or a heat source that exceeds the polymer trigger temperature. The drawbacks with this type of Linear Heat Detection Systems are:
(1) The fact that only a single point fire can be detected as the sensing cable will be in electrical contact (short circuit) at the point of the closest fire and the system cannot detect another event further down the cable.
(2) The fact that no advance warning is available before the cable polymer coating reaches the set temperature and melts. There may be a gradual increase in temperature over a long time that may be detected using a well placed temperature measuring device like e.g. a thermo-couple.

To overcome the drawbacks of electrical sensors, Distributed Temperature Sensing (DTS) systems based on fiber optics has been introduced to the Linear Heat Detection System market. Fiber optic based DTS systems provide near real-time temperature measurements along the complete length of an optical fiber. A DTS system uses a sensing cable consisting of an optical fiber encased in suitable materials to provide the ruggedness required for the deployment and operating environment.

The DTS system transmits a laser pulse down the optical fiber. As the laser pulse travels down the optical fiber, it interacts with the molecular structure of the fused silica in the optical fiber core. These interactions cause a fraction of the light to scatter back towards the DTS system. The most common back scattered signals are Rayleigh, Brillouin Stokes and Brillouin anti-Stoke components as well as Raman Stokes and Raman anti-Stoke components. Filtering out and measuring selected components of the back-scattered light allows calculation the temperature along the optical fiber.

The ratio of the intensities of the Raman Stokes to Raman anti-Stokes components can be used to calculate the temperature at the point where the scattering event took place. The refractive index of the optical fiber is well known, and the speed of light is well known. This allows a time-of-flight calculation to be done by measuring the time between launch of the laser pulse and the return of the backscattered light.

The drawback of existing DTS is that the Raman Stokes and anti-Stokes signals are very weak and a fair number of averages must be done to achieve a good temperature resolution. This has in the past limited the response time of DTS based LHDS systems. Recent advances in DTS technology, has improved the performance of the systems to a point where the cable response time to thermal events is a significant portion of the overall system response time.

This invention disclosure outlines a system and method to significantly improve the overall system response time.

BRIEF SUMMARY OF THE DISCLOSURE

The present disclosure describes a system and method for providing greatly improved linear heat detection using fiber optic distributed temperature systems (DTS). The invention makes use of correction algorithms that anticipate exterior temperature increases based on the rate of measured temperature changes.

This is accomplished by a method for providing rapid linear heat detection through a region of interest using fiber optic distributed temperature systems including at least the steps of: deploying a fiber optic distributed temperature sensing cable through the region of interest; the fiber optic distributed temperature sensing cable connected to a distributed temperature measurement system; continuously measuring a temperature trace at multiple discreet points along the fiber optic distributed temperature sensing cable by collecting and measuring backscattered Stokes and Anti-Stokes signals; for each time t calculating a rate of change D from time t−1 to t of temperature at discreet points along the fiber optic distributed temperature sensing cable; calculating a corrected temperature Tc for time t at each discreet point along the fiber optic distributed temperature sensing cable based on a formula $Tc=Tm+Kd*D$; wherein Tm is the temperature measured at time t at each discreet point along the fiber optic distributed temperature sensing cable; and wherein Kd is a constant predetermined by experimental characterization of the response lag of the deployed fiber optic distributed temperature sensing cable.

This is also accomplished by a system for providing rapid heat detection through a region of interest using fiber optic distributed temperature systems comprising; a distributed temperature measurement system; a fiber optic distributed temperature sensing cable connected to the distributed temperature measurement system and deployed through the region of interest; a processing module in the distributed temperature measurement system which is programmed to continuously measure a temperature trace at multiple discreet points along the fiber optic distributed temperature sensing cable by collecting and measuring backscattered Stokes and Anti-Stokes signals; wherein the processing module for each time t calculates a rate of change D from time t−1 to t of temperature at discreet points along the fiber optic distributed temperature sensing cable and further calculates a corrected temperature Tc for time t at each discreet point along the fiber optic distributed temperature sensing cable based on a formula $Tc=Tm+Kd*D$; wherein Tm is the temperature measured at time t at each discreet point along the fiber optic distributed temperature sensing cable; and wherein Kd is a constant predetermined by experimental characterization of the response lag of the deployed fiber optic distributed temperature sensing cable.

This is also accomplished by a method for providing rapid linear heat detection through a region of interest using fiber optic distributed temperature systems including at least the steps of: deploying a fiber optic distributed temperature sensing cable through the region of interest; the fiber optic distributed temperature sensing cable connected to a distributed temperature measurement system; continuously measuring a temperature trace at multiple discreet points along the fiber optic distributed temperature sensing cable by collecting and measuring backscattered Stokes and Anti-Stokes signals; for each time t calculating a derivative or rate of change D from time t−1 to t of temperature at discreet points along the fiber optic distributed temperature sensing cable; for each time t calculating differences between the current DTS trace and the previous trace) and summing those differences to integrate the deviations and compute an accumulated offset I at discreet points along the fiber optic distributed temperature sensing cable; for each time t calculating differences between the current DTS trace and the previous trace) to compute a proportional deviations P at discreet points along the fiber optic distributed temperature sensing cable calculating a corrected temperature Tc for time t at each discreet point along the fiber optic distributed temperature sensing cable based on a formula $Tc=Tm+Kd*D+Ki*I+Kp*P$ wherein Tm is the temperature measured at time t at each discreet point along the fiber optic distributed temperature sensing cable; and wherein Kd, Ki, and Kp are constants predetermined by experimental characterization of the response lag of the deployed fiber optic distributed temperature sensing cable.

This is also accomplished by a system for providing rapid heat detection through a region of interest using fiber optic distributed temperature systems comprising; a distributed temperature measurement system; a fiber optic distributed temperature sensing cable connected to the distributed temperature measurement system and deployed through the region of interest; a processing module in the distributed temperature measurement system which is programmed to continuously measure a temperature trace at multiple discreet points along the fiber optic distributed temperature sensing cable by collecting and measuring backscattered Stokes and Anti-Stokes signals; wherein the processing module for each time t calculates a derivative rate of change D from time t−1 to t of temperature at discreet points along the fiber optic distributed temperature sensing cable; wherein the processing module for each time t calculates differences between the current DTS trace and the previous trace) and sums those differences to integrate the deviations and compute an accumulated offset I at discreet points along the fiber optic distributed temperature sensing cable; wherein the processing module for each time t calculates differences between the current DTS trace and the previous trace to compute a proportional deviations P at discreet points along the fiber optic distributed temperature sensing cable; wherein the processing module for each time t further calculates a corrected temperature Tc for time t at each discreet point along the fiber optic distributed temperature sensing cable based on a formula Tc=Tm+Kd*D+Ki*I+Kp*P; and wherein the processing module for each time t; wherein Tm is the temperature measured at time t at each discreet point along the fiber optic distributed temperature sensing cable; and wherein Kd, Ki, and Kp are constants predetermined by experimental characterization of the response lag of the deployed fiber optic distributed temperature sensing cable.

BRIEF DESCRIPTION OF THE SEVERAL VIEWS OF THE DRAWINGS

For a more complete understanding of the present invention, reference is now made to the following drawings, in which.

DETAILED DESCRIPTION

Linear Heat Detection Systems based on Distributed Temperature Sensing (DTS) of this disclosure provide a true distributed measurement that allows the user to monitor the temperature along the full length of the sensing cable with rapid response.

Figure 1:
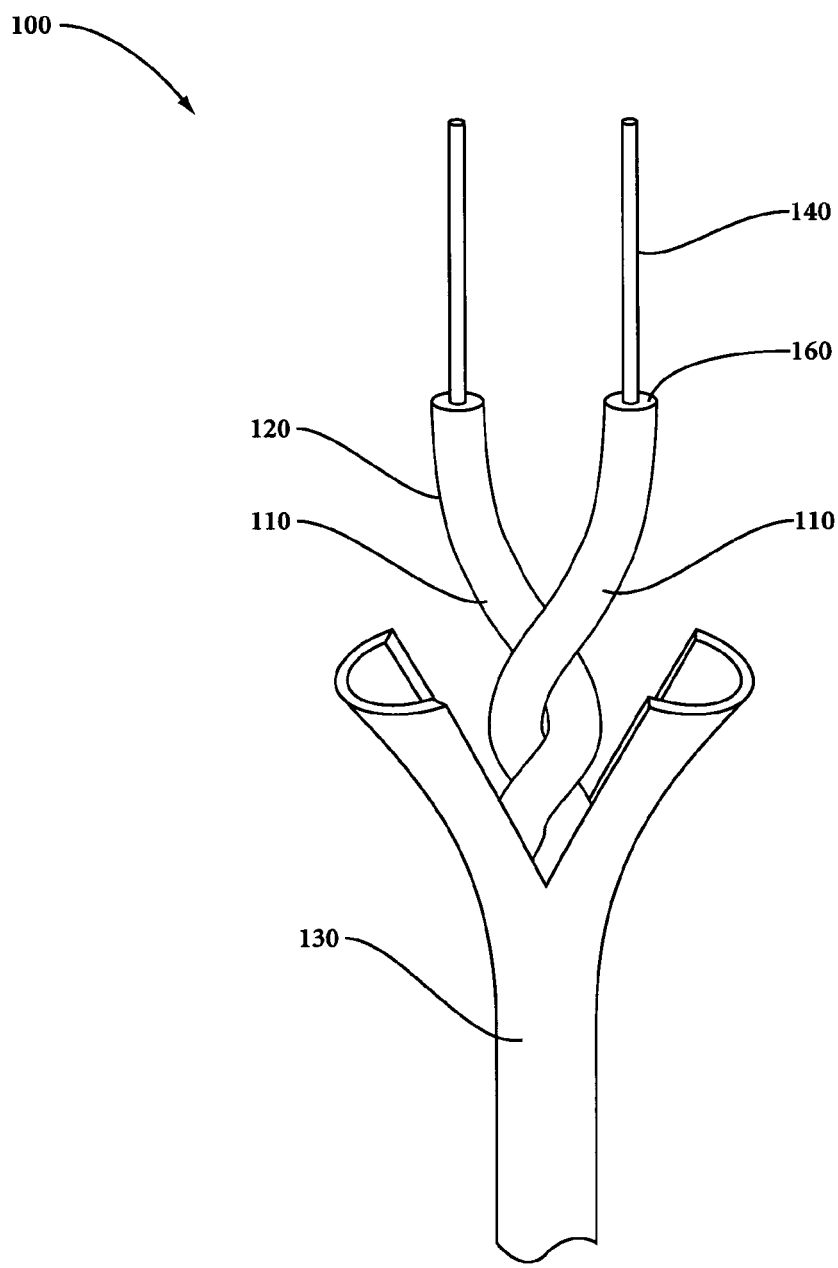
FIG. 1 shows a prior art linear heat detection system of the prior art.

FIG. 1 illustrates a prior art digital Linear Heat Detection Sensing (LHDS) system 100 used in fire detection. This type of sensing cable often comprises a twisted pair core cable 110. Each core has a carefully selected metal 140 to add tensile strength and good conductivity while providing good corrosion resistance. This twisted pair core cable is then deployed under tension. The conductor has special heat reactive polymer insulation 120 and an overall protective sheath 130. The primary mechanism of heat (fire) detection is that the inner core insulating polymer 160 is specially formulated such that it plasticizes at a specific temperature. The cable is constructed such that the twisted steel cores are in tension, and at the polymer trigger temperature the conductors connect. This provides an alarm signal to any associated monitoring device. The system will be able to detect a single point fire or a heat source that exceeds the polymer trigger temperature.

Figure 2:
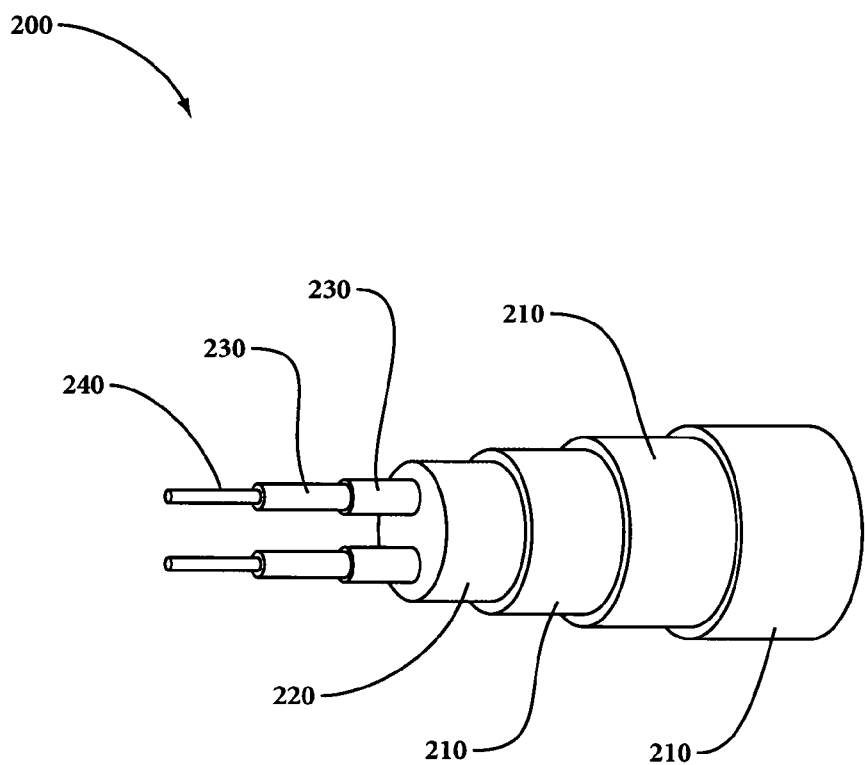
FIG. 2 shows a DTS heat sensing cable system.

Fiber optic cables used for temperature sensing in linear heat detection and alarm systems have a number of design constraints. They must be flexible, lightweight, robust, reliable and easy to install. An example fiber optic fire sensing cable 200 is shown in FIG. 2 with three different protective sheaths 210 as well as gel 220 and fiber 230 coatings around the innermost optical fibers 240.

The cables are adapted to specific usage by varying the thickness and composition of the four outermost layers—the gel compound, Inner protective sheath, Primary protective sheath, and Outer protective sheath. Altering the composition of these layers affects both the weight and diameter of the sensing cable.

These cables must also have a fast thermal response to respond to any of the applications mentioned earlier. The response time for a heat detection system is a function of how fast and accurate the DTS system can detect thermal changes in the immediate environment of the sensing cable. An important factor in that is the thermal response of the overall heat sensing cable, with multiple layers of protective sheaths. This thermal response is highly dependent on the materials used in the cable and the dimensions of these materials.

With previous systems, the system thermal response has been dominated by the DTS system response time. As systems are becoming faster and more accurate, the cable thermal response becomes more and more significant. When a thermal event occurs, the temperature inside the cable will be different from the temperature in the cable core.

The lag between the true external temperature surrounding the sensing cable, and the temperature of the cable core where the optical fiber is located, will also vary with the speed of the thermal event.

Figure 3:
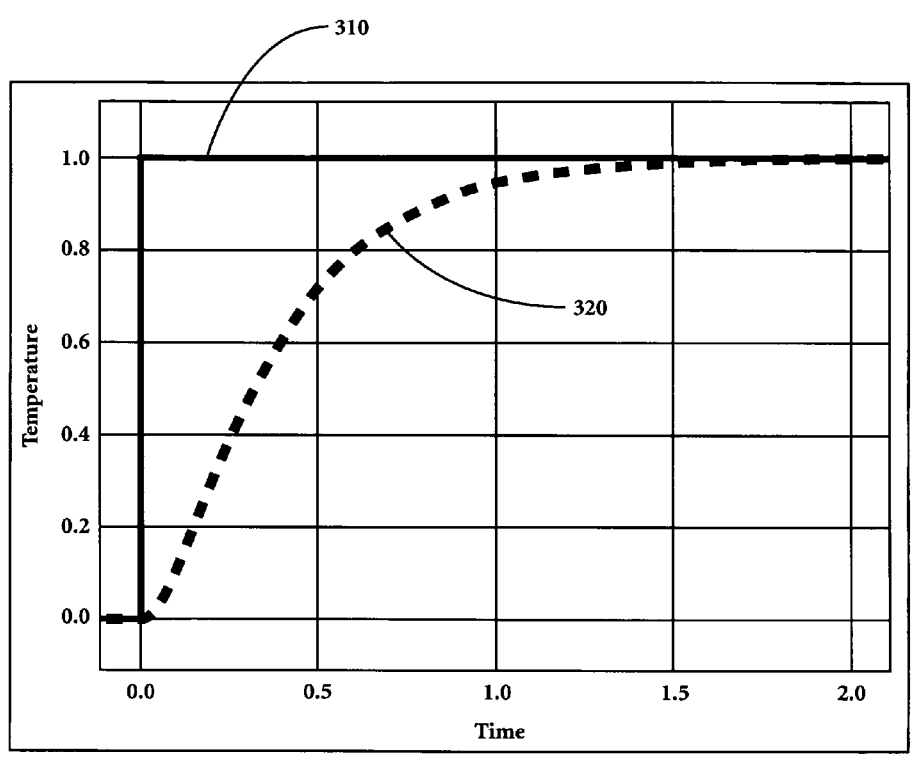
FIG. 3 illustrates the lag time response of a shielded cable to a step change exterior temperature.

To illustrate this type of lag and how it can hinder rapid detection of a fire condition an idealized thermal system is illustrated in FIG. 3 in which a step change external temperature 310, such as a sudden fire, or the passing of a slug of material in a down hole environment, is measured internally by the optical fiber by the curve 320, illustrating the slow thermal response of the well insulated cable.

It has been found however, that by carefully characterizing the cable over various conditions, the response lag shown in FIG. 3 lag can be calculated, corrected for and the temperature measurement deviations can be minimized.

In use the proposed heat detection embodiment is installed by running a fiber optic distributed temperature sensing cable through the region of interest to be monitored. The fiber optic distributed temperature sensing cable is connected to a distributed temperature sensing (DTS) system. The DTS system also has a processing module, which can be in hardware or programming, that continuously sends a laser probe signal down the extended fiber optic distributed temperature sensing cable and continuously measures a temperature trace at multiple discreet points along the fiber optic distributed temperature sensing cable by collecting and measuring backscattered Stokes and Anti-Stokes signals. The temperature trace is a measurement of temperature at multiple discreet points along the extended fiber optic distributed temperature sensing cable. The trace is measured continuously and recorded at times t, t+1, t+2, etc.

The processor performs a first order correction along the trace formulated as follows:

$$Tc - Tm = K_d \frac{d}{dt} e(t) \qquad \text{eq. [1]}$$

In which Tc=temperature after correction, Tm=temperature measured (current DTS trace), and the derivative term is the rate of change between the current DTS trace and the previous trace (using uncorrected data). The gain factor Kd is a predetermined constant determined by careful experimental characterization of the response lag of the particular cable system and/or modeling of the cable and its material and thermal properties. For example, in the application of sulfur pipelines the modeling would include the pipeline thermal properties as well as the thermal properties of sulfur in different states.

This first order or derivative correction used as part of a temperature alarm protocol enables much faster and more accurate temperature measurements that allow the user to monitor how the fire is spreading and where the smoke is going. Temperature can be displayed in color and be overlaid with maps or drawings of the infrastructure. Using this information, people may be directed away from hazardous fire and smoke towards safe fire exits while optimizing the use of fire fighting measures. In addition the system can sound alarms when predefined temperature limits are exceeded and personnel can immediately see where the temperature excursion has happened. In the case of a fire the evolution of the fire can be monitored during a fire fighting operation, minimizing damage to people, property and assets.

Experimental results have shown that this first order correction or derivative correction can result in much faster responses and using a derivative correction only is an aspect of this invention.

Experimental work has also shown that if too large correction factors are used the resulting predicted temperature after correction can exhibit oscillation and overshoot, which is known from using only first order derivative corrections in non-linear systems.

Figure 4:
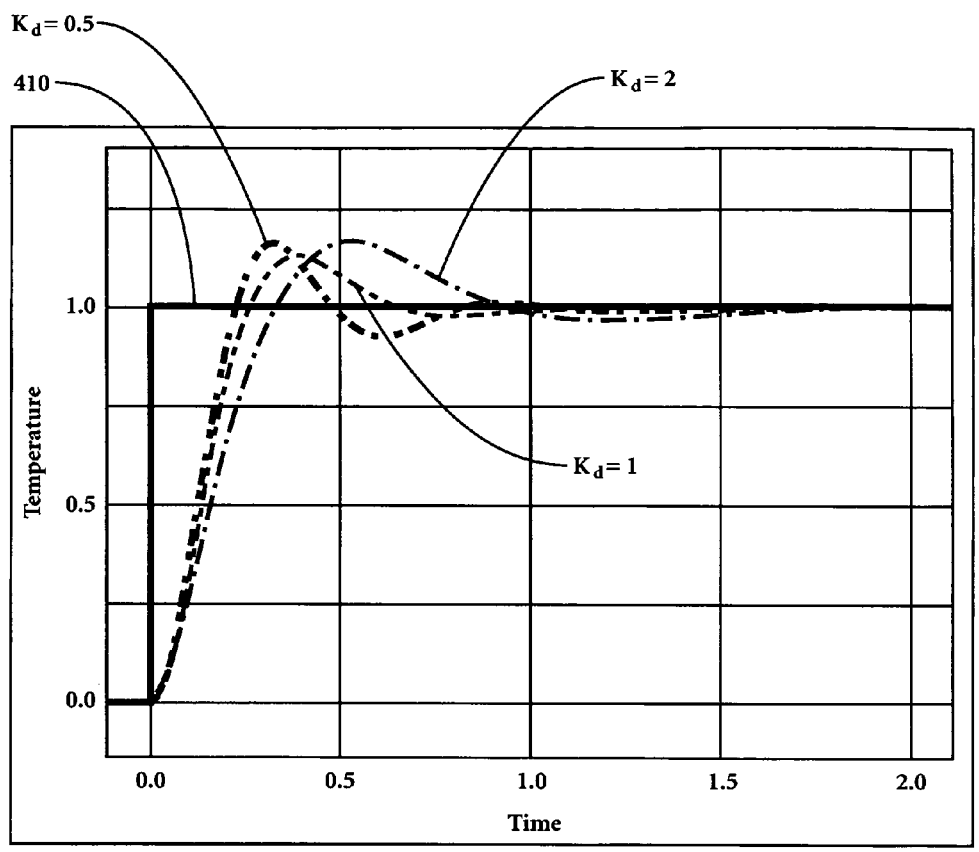
FIG. 4 illustrates lag time responses to various first order derivative corrections.

FIG. 4 illustrates the issues that can result from applying a strict first order derivative type control with various simulated responses corresponding to different derivative gains applied. In this example the response is much improved over the example of FIG. 3. But also note that both overshoot and oscillation can result and varies depending on the derivative gain chosen.

Accordingly this invention also anticipates the use of correction schemes using not only first order derivative correction but also the use of integral response and proportional response as in proportional-integral-derivative (PID) control loops.

A proportional-integral-derivative (PID) is a generic control loop feedback mechanism widely used in industrial control systems—a PID is the most commonly used feedback controller. A PID controller calculates an "error" value as the difference between a measured process variable and a desired setpoint. The controller attempts to minimize the error by adjusting the process control inputs. In the absence of knowledge of the underlying process, a PID controller is the best controller. However, for best performance, the PID parameters used in the calculation must be tuned according to the nature of the system—while the design is generic, the parameters depend on the specific system. In the embodiments of this disclosure the PID concept is used not for control but for faster response and accurate prediction of deviations or sudden temperature changes, such as in for example a fire somewhere along the fiber optic cable in the region of interest.

The PID scheme involves three separate parameters, the proportional, the integral and derivative values, denoted P, I, and D. The proportional value determines the reaction to the current deviations, the integral value determines the reaction based on the sum of recent deviations, and the derivative value determines the reaction based on the rate at which the deviations have been changing. The weighted sum of these three actions is used to predict the changing temperature. Heuristically, these values can be interpreted in terms of time: P depends on the present deviation, I on the accumulation of past deviations, and D is a prediction of future deviations, based on current rate of change.

By tuning the three constants in the PID scheme, the prediction can be optimized. The response of the predictor can be described in terms of the responsiveness of the predictor to the temperature deviations, the degree to which the prediction overshoots the real temperature and the degree of measurement oscillation.

Some applications may require using only one or two modes to provide the appropriate system prediction. This is achieved by setting the gains of undesired outputs to zero. A PID scheme will be called a PI, PD, P or I in the absence of the respective control actions. PI schemes are fairly common, since derivative action is sensitive to measurement noise, whereas the absence of an integral value may prevent the system from reaching its target value due to the control action.

Consider the integral gain. The contribution from the integral term (sometimes called reset) is proportional to both the magnitude of the deviation and the duration of the deviation. Summing the instantaneous deviations over time (integrating) gives the accumulated offset that should have been corrected previously. The accumulated deviation is then multiplied by the integral gain and added to the controller output. The magnitude of the contribution of the integral term to the overall prediction is determined by the integral gain, Ki.

The integral correction term is given by:

$$Tc - Tm = K_i \int_0^t e(\tau)\, d\tau \qquad \text{eq. [2]}$$

In which Tc=temperature after correction, Tm=temperature measured (current DTS trace). In using an integral correction scheme the instantaneous changes over time e(t) (differences between the current DTS trace and the previous trace) are summed to integrate the deviations and that gives an accumulated offset that is multiplied by the experimentally determined integral gain $K_i$ to yield a temperature change (Tc−Tm) from the current trace Tm to the new temperature projection Tc. The gain factor $K_i$ is a predetermined constant determined by careful experimental characterization of the response lag of the particular cable system and/or modeling of the cable and its material and thermal properties.

Finally, a proportion gain approach can be used. The proportional correction term is given by:

$$Tc - Tm = K_p * e(t) \qquad \text{eq. [3]}$$

In which Tc=temperature after correction, Tm=temperature measured (current DTS trace). In using a proportional correction scheme the changes over time e(t) (differences between the current DTS trace and the previous trace) are multiplied by an experimentally determined proportional gain $K_p$ to yield a temperature change (Tc−Tm) from the current trace Tm to the new temperature projection Tc.

When all three proportional-integral-derivative are used in the same correction scheme the correction equation becomes:

$$Tc - Tm = K_p * e(t) + K_i \int_0^t e(\tau)\, d\tau + K_d \frac{d}{dt} e(t) \qquad \text{eq. [4]}$$

And in this case the initial calibration or experimental work would simultaneously determine the characteristic Kp, Ki, and Kd values that would give the optimum correction performance for the system. These would be different from the values determined for instance by calibration only a derivative correction scheme. The value of all three factors though is a potential improvement in corrected temperature prediction resulting in an improved fire detection system.

Figure 5:
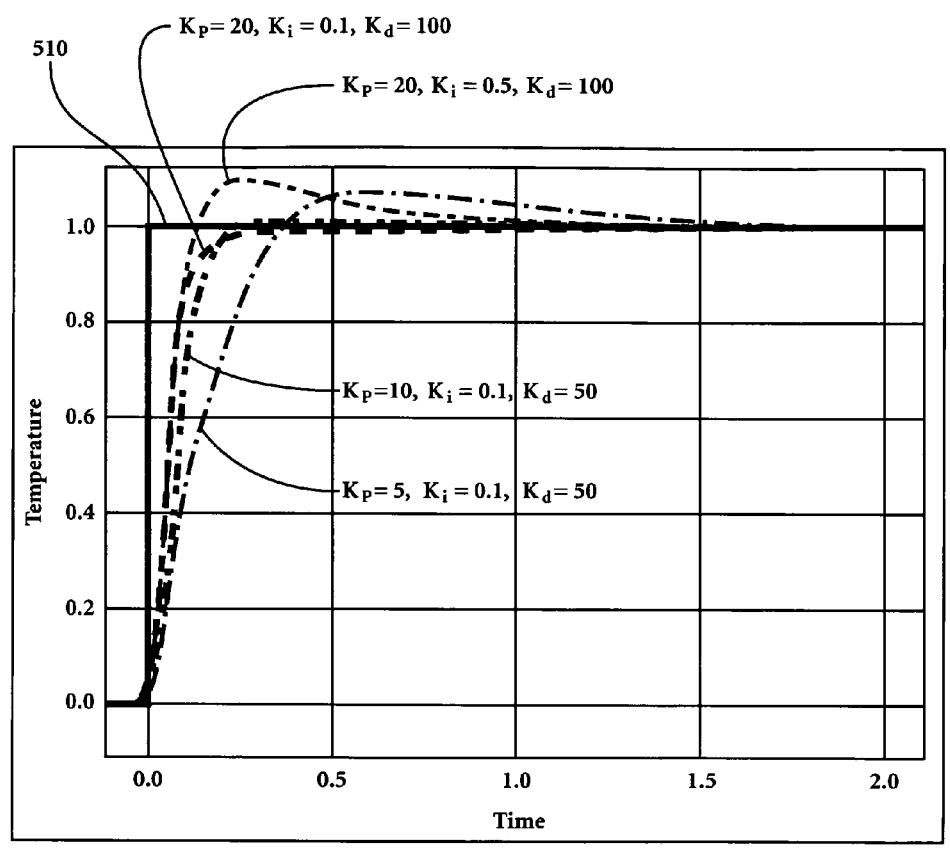
FIG. 5 illustrates corrected lag time responses using combination corrections including proportional, integral, and derivative.

FIG. 5 illustrates the resulting improvements when proportional, integral, and derivative gain (Kp, Ki, Kd) are applied to measured differences over time. Proper characterizations and resulting tuning of the correction algorithm can result in not only rapid response but also the elimination of oscillation and offset. Note that the response with gain parameters Kp=10, Ki=0.1, and Kd=50 yield a rapid response prediction with minimal overshoot and oscillation.

UTILITY

The proposed method and systems for providing rapid linear heat detection through a region of interest using fiber optic distributed temperature systems represents a superior solution to rapid detection of extreme temperature prediction such as in fire situations.

All of the methods disclosed and claimed herein can be executed without undue experimentation in light of the present disclosure. While the methods of this disclosure may have been described in terms of preferred embodiments, it will be apparent to those of ordinary skill in the art that variations may be applied to the methods and in the steps or in the sequence of steps of the method described herein without departing from the concept, spirit and scope of the disclosure. All such similar substitutes and modifications apparent to those skilled in the art are deemed to be within the spirit, scope, and concept of the disclosure as defined by the appended claims.

The invention claimed is:

1. A method for providing rapid linear heat detection through a region of interest using fiber optic distributed temperature systems comprising the steps of:
   a. deploying a fiber optic distributed temperature sensing cable through the region of interest; said fiber optic distributed temperature sensing cable connected to a distributed temperature measurement system;
   b. continuously measuring a temperature trace at multiple discreet points along the fiber optic distributed temperature sensing cable by collecting and measuring backscattered Stokes and Anti-Stokes signals;
   c. for each time t calculating a derivative or rate of change D from time t−1 to t of temperature at discreet points along the fiber optic distributed temperature sensing cable;
   d. calculating a corrected temperature Tc for time t at each discreet point along the fiber optic distributed temperature sensing cable based on a formula Tc=Tm+Kd*D;
   wherein Tm is the temperature measured at time t at each discreet point along the fiber optic distributed temperature sensing cable; and
   wherein Kd is a constant predetermined by experimental characterization of the response lag of the deployed fiber optic distributed temperature sensing cable.

2. The method for providing rapid linear heat detection using fiber optic distributed temperature systems of claim 1 wherein the corrected temperature trace Tc for each discreet point along the fiber optic distributed temperature sensing cable is displayed on a monitor.

3. The method for providing rapid linear heat detection using fiber optic distributed temperature systems of claim 1 wherein changes in Tc for any discreet point along the fiber optic distributed temperature sensing cable above a predefined temperature triggers an alarm.

4. A system for providing rapid heat detection through a region of interest using fiber optic distributed temperature systems comprising;
   a. a distributed temperature measurement system;
   b. a fiber optic distributed temperature sensing cable connected to said distributed temperature measurement system and deployed through said region of interest;
   c. a processing module in said distributed temperature measurement system which is programmed to continuously measure a temperature trace at multiple discreet points along the fiber optic distributed temperature sensing cable by collecting and measuring backscattered Stokes and Anti-Stokes signals;
   d. wherein said processing module for each time t calculates a derivative rate of change D from time t−1 to t of temperature at discreet points along the fiber optic distributed temperature sensing cable and further calculates a corrected temperature Tc for time t at each discreet point along the fiber optic distributed temperature sensing cable based on a formula Tc=Tm+Kd*D;
   e. wherein Tm is the temperature measured at time t at each discreet point along the fiber optic distributed temperature sensing cable; and
   f. wherein Kd is a constant predetermined by experimental characterization of the response lag of the deployed fiber optic distributed temperature sensing cable.

5. The system for providing rapid heat detection through a region of interest using fiber optic distributed temperature systems of claim 4 wherein the corrected temperature trace Tc for each discreet point along the fiber optic distributed temperature sensing cable is displayed on a monitor.

6. The system for providing rapid heat detection through a region of interest using fiber optic distributed temperature systems of claim 4 wherein changes in Tc for any discreet point along the fiber optic distributed temperature sensing cable above a predefined temperature triggers an alarm.

7. A method for providing rapid linear heat detection through a region of interest using fiber optic distributed temperature systems comprising the steps of:
   a. deploying a fiber optic distributed temperature sensing cable through the region of interest; said fiber optic distributed temperature sensing cable connected to a distributed temperature measurement system;
   b. continuously measuring a temperature trace at multiple discreet points along the fiber optic distributed temperature sensing cable by collecting and measuring backscattered Stokes and Anti-Stokes signals;
   c. for each time t calculating a derivative or rate of change D from time t−1 to t of temperature at discreet points along the fiber optic distributed temperature sensing cable;
   d. for each time t calculating differences between the current DTS trace and the previous trace) and summing those differences to integrate the deviations and compute an accumulated offset I at discreet points along the fiber optic distributed temperature sensing cable;
   e. for each time t calculating differences between the current DTS trace and the previous trace) to compute a proportional deviation P at discreet points along the fiber optic distributed temperature sensing cable f. calculating a corrected temperature Tc for time t at each discreet point along the fiber optic distributed temperature sensing cable based on a formula Tc=Tm+Kd*D+Ki*I+Kp*P;

g. wherein Tm is the temperature measured at time t at each discreet point along the fiber optic distributed temperature sensing cable; and h. wherein Kd, Ki, and Kp are gain constants predetermined by experimental characterization of the response lag of the deployed fiber optic distributed temperature sensing cable.

8. The method for providing rapid heat detection through a region of interest using fiber optic distributed temperature systems of claim 7 wherein the corrected temperature trace Tc for each discreet point along the fiber optic distributed temperature sensing cable is displayed on a monitor.

9. The method for providing rapid heat detection through a region of interest using fiber optic distributed temperature systems of claim 7 wherein changes in Tc for any discreet point along the fiber optic distributed temperature sensing cable above a predefined temperature triggers an alarm.

10. A system for providing rapid heat detection through a region of interest using fiber optic distributed temperature systems comprising;

a. a distributed temperature measurement system;

b. a fiber optic distributed temperature sensing cable connected to said distributed temperature measurement system and deployed through said region of interest;

c. a processing module in said distributed temperature measurement system which is programmed to continuously measure a temperature trace at multiple discreet points along the fiber optic distributed temperature sensing cable by collecting and measuring backscattered Stokes and Anti-Stokes signals;

d. wherein said processing module for each time t calculates a derivative rate of change D from time t−1 to t of temperature at discreet points along the fiber optic distributed temperature sensing cable;

e. wherein said processing module for each time t calculates differences between the current DTS trace and the previous trace) and sums those differences to integrate the deviations and compute an accumulated offset I at discreet points along the fiber optic distributed temperature sensing cable;

f. wherein said processing module for each time t calculates differences between the current DTS trace and the previous trace to compute a proportional deviation P at discreet points along the fiber optic distributed temperature sensing cable;

g. wherein said processing module for each time t further calculates a corrected temperature Tc for time t at each discreet point along the fiber optic distributed temperature sensing cable based on a formula Tc=Tm+Kd*D+Ki*I+Kp*P;

h. wherein Tm is the temperature measured at time t at each discreet point along the fiber optic distributed temperature sensing cable; and i. wherein Kd, Ki, and Kp are constants predetermined by experimental characterization of the response lag of the deployed fiber optic distributed temperature sensing cable.

11. The method system for providing rapid heat detection through a region of interest using fiber optic distributed temperature systems of claim 10 wherein the corrected temperature trace Tc for each discreet point along the fiber optic distributed temperature sensing cable is displayed on a monitor.

12. The method system for providing rapid heat detection through a region of interest using fiber optic distributed temperature systems of claim 10 wherein changes in Tc for any discreet point along the fiber optic distributed temperature sensing cable above a predefined temperature triggers an alarm.

* * * * *

UNITED STATES PATENT AND TRADEMARK OFFICE
CERTIFICATE OF CORRECTION

| | | |
|---|---|---|
| PATENT NO. | : 8,894,277 B2 | Page 1 of 1 |
| APPLICATION NO. | : 13/503152 | |
| DATED | : November 25, 2014 | |
| INVENTOR(S) | : David Barfoot et al. | |

It is certified that error appears in the above-identified patent and that said Letters Patent is hereby corrected as shown below:

In The Claims,

Col. 12, Claim 11, lines 25; Claim 12, lines 32,

"The method system for providing" should read "The system for providing..."

Signed and Sealed this
Twenty-eighth Day of April, 2015

Michelle K. Lee
*Director of the United States Patent and Trademark Office*